United States Patent
Grumann et al.

(10) Patent No.: US 8,689,564 B2
(45) Date of Patent: Apr. 8, 2014

(54) FOSSIL-FUELED POWER STATION COMPRISING A CARBON DIOXIDE SEPARATION DEVICE AND METHOD FOR OPERATING A FOSSIL-FUELED POWER STATION

(75) Inventors: Ulrich Grumann, Erlangen (DE); Jens Keyser, Fürth (DE); Ulrich Much, Erlangen (DE); Andreas Pickard, Adelsdorf (DE); Mike Rost, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/503,438

(22) PCT Filed: Oct. 29, 2010

(86) PCT No.: PCT/EP2010/066507
§ 371 (c)(1),
(2), (4) Date: Jun. 26, 2012

(87) PCT Pub. No.: WO2011/051468
PCT Pub. Date: May 5, 2011

(65) Prior Publication Data
US 2012/0256421 A1 Oct. 11, 2012

(30) Foreign Application Priority Data
Nov. 2, 2009 (DE) .................. 10 2009 051 608

(51) Int. Cl.
*F02C 1/00* (2006.01)
*F02G 1/00* (2006.01)

(52) U.S. Cl.
USPC .......................................... 60/772; 60/39.182

(58) Field of Classification Search
USPC ................ 60/39.182, 39.5, 772, 775; 95/236; 423/220–229
See application file for complete search history.

(56) References Cited

U.S. PATENT DOCUMENTS

| | | | | |
|---|---|---|---|---|
| 4,942,734 | A | * | 7/1990 | Markbreiter et al. ........... 60/783 |
| 6,655,150 | B1 | * | 12/2003 | Asen et al. ..................... 60/772 |
| 7,559,977 | B2 | | 7/2009 | Fleischer et al. |
| 2008/0000237 | A1 | * | 1/2008 | Briesch et al. .................. 60/772 |
| 2008/0011161 | A1 | * | 1/2008 | Finkenrath et al. ................. 96/4 |
| 2010/0326074 | A1 | | 12/2010 | Okita et al. |
| 2011/0048011 | A1 | | 3/2011 | Hirata et al. |

FOREIGN PATENT DOCUMENTS

| | | |
|---|---|---|
| EP | 1473072 A1 | 11/2004 |
| GB | 2470645 A | 12/2010 |
| WO | WO 0048709 A1 | 8/2000 |
| WO | WO 2005045316 A2 | 5/2005 |
| WO | WO 2011039263 A1 | 4/2011 |

* cited by examiner

*Primary Examiner* — Phutthiwat Wongwian
*Assistant Examiner* — Scott Walthour

(57) ABSTRACT

A fossil-fueled power station including a steam turbine is provided. A steam generator is mounted downstream of the steam turbine via a steam return line and a carbon dioxide separation device. The carbon dioxide separation device is connected to the steam return line via a process steam line and a backpressure steam turbine is mounted into the process steam line.

6 Claims, 1 Drawing Sheet

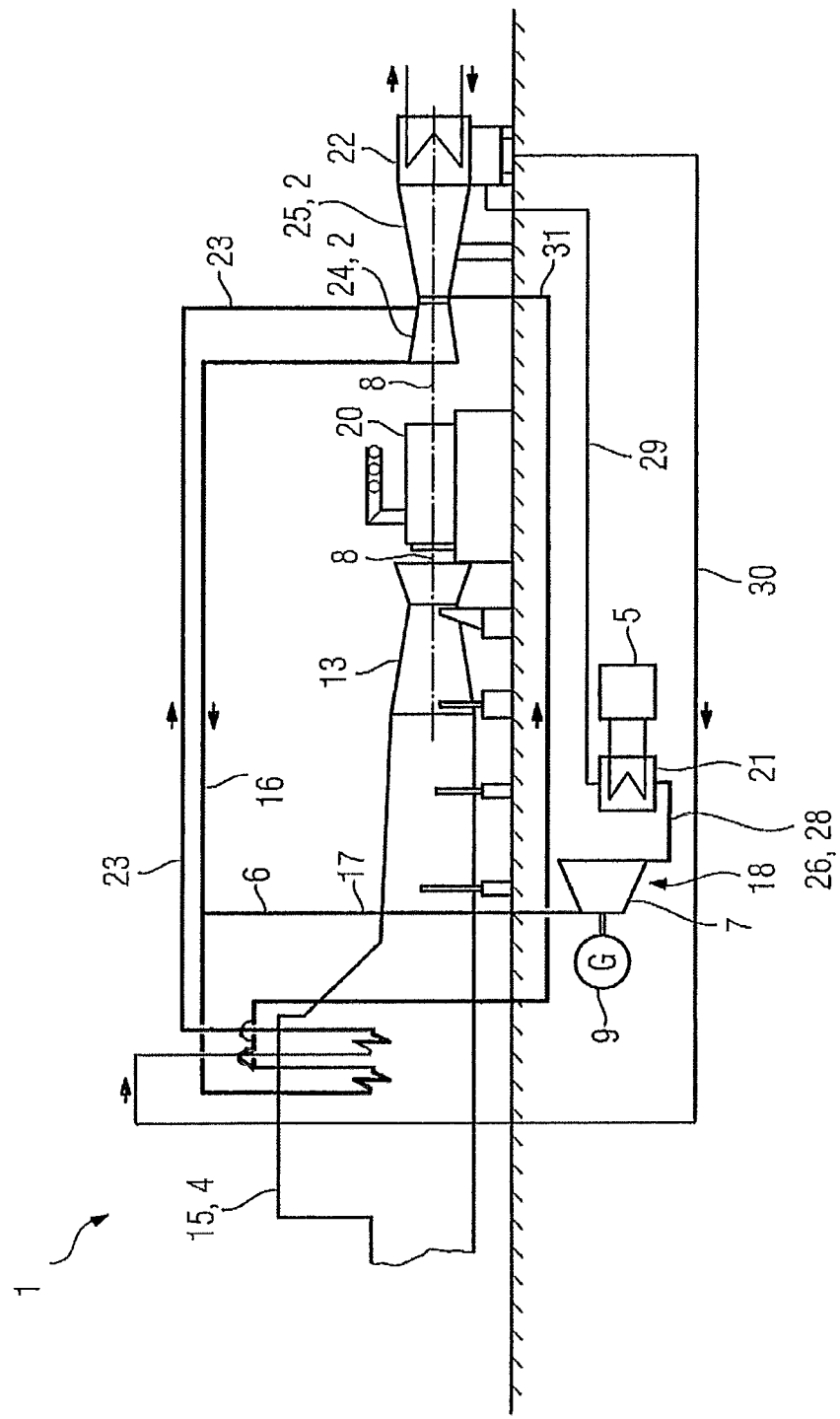

FOSSIL-FUELED POWER STATION COMPRISING A CARBON DIOXIDE SEPARATION DEVICE AND METHOD FOR OPERATING A FOSSIL-FUELED POWER STATION

CROSS REFERENCE TO RELATED APPLICATIONS

This application is the US National Stage of International Application No. PCT/EP2010/066507, filed Oct. 27, 2010 and claims the benefit thereof. The International Application claims the benefits of German application No. 10 2009 051 608.5 DE filed Nov. 2, 2009. All of the applications are incorporated by reference herein in their entirety.

FIELD OF INVENTION

A fossil-fueled power station including a steam turbine, a steam generator mounted downstream of the steam turbine via a steam return line and a carbon dioxide separation device is provided.

BACKGROUND OF INVENTION

The separation of carbon dioxide out of the exhaust gases from fossil-fueled power stations, such as for example combined cycle gas turbine (CCGT) power stations or coal-fired steam turbine power stations, requires a large amount of energy.

If use is made of a wet-chemical absorption-desorption method for the separation of carbon dioxide, this energy must be supplied in the form of thermal energy for heating the desorption process. Usually, low-pressure steam from the power station's steam circuit is used for this purpose.

Even if a power station which is in the course of being built is not yet equipped with a carbon dioxide separation device connected into it, there is nowadays already an obligation to demonstrate that it can be retrofitted (capture readiness). Accordingly, appropriate provisions are nowadays already being made so that at a later point in time a carbon dioxide separation device can be integrated into the power station without any problems. This type of provision affects, for example, the machine housing, which must be appropriately enlarged for the extraction of the low pressure steam.

In addition, there is a requirement that the steam turbine or the power station process must be appropriately configured for the extraction of low pressure steam. In the case of steam turbines with separate housings for the medium- and low-pressure stages, the extraction of low pressure steam at the overflow line is an easy possibility. On the other hand, in the case of steam turbines with a single-housing medium- and low-pressure stage, it is not possible to extract the required large quantity of steam from the turbine at a suitable pressure.

The extraction of steam from other sources within the power station process is often not economical, or is not possible in a suitable way. Thus, for example, extraction from a reheater line on the steam turbine produces an unbalanced load on the boiler. Extraction of higher grade steam for the carbon dioxide separation device must also be excluded, because this leads to unacceptable energy losses.

SUMMARY OF INVENTION

It is therefore the object of the invention to specify a device and a method for a fossil-fueled power station, for providing low pressure steam for a carbon dioxide separation device from a source other than the overflow line between the medium- and low-pressure stages, so that an unbalanced load in the power station process is avoided and the energy losses due to the extraction of the steam are largely minimized.

That object of the invention which relates to a device is achieved by the characteristics of the claims.

Here, the invention starts with a steam turbine which has a single-housing medium- and low-pressure stage. Apart from the medium- and low-pressure stages, the steam turbine also incorporates a high pressure stage in a separate housing. In this case, provision is made so that, after it emerges from the high pressure stage, the live steam for the high pressure stage is fed back via a steam return line (cold reheater line) into the boiler for reheating (reheating). In accordance with the invention, provision is now made so that a process steam line, which is connected to the carbon dioxide separation device, is connected to the steam return line, with a back-pressure steam turbine being connected into the process steam line. The back-pressure steam turbine brings the process steam which has been extracted to the condition for process steam (saturated steam). The boiler must be appropriately designed for the extraction of the steam.

In an advantageous development of the fossil-fueled power station, the process steam which has been extracted is converted to electrical power by a generator connected to the back-pressure steam turbine. By this means, the excess energy in the process steam can be used for the generation of electrical power.

In an expedient embodiment of the fossil-fueled power station, the carbon dioxide separation process consists of an absorption unit and a desorption unit. The process steam line is then connected to the input side on a heat exchanger in the desorption unit. On the output side, the desorption unit is connected to a condensate return line.

That object of the invention which relates to a method is achieved by the characteristics of the claims.

In an analogous way as with the device, in the case of the inventive method the process steam is extracted from the steam return line. The process steam is in this case expanded in an expansion process, which produces expanded steam (saturated steam). The expanded steam is then fed to the carbon dioxide separation device.

It is advantageous if the expansion process is used for the generation of electrical power. The expanded steam is here preferably used for heating the desorption process in the carbon dioxide separation process.

The preparatory measures for "capture ready" are reduced by the invention to an appropriate boiler design and a connection point outside the system-critical machine housing. When a carbon dioxide separation device is retrofitted, the steam turbine can be thermodynamically optimized for the separation process then used. The connection of the back-pressure turbine before the reheater leads to lower temperature steam, which can be expanded with no problem using standard industrial turbines.

BRIEF DESCRIPTION OF THE DRAWINGS

The invention is explained in more detail below by reference to a drawing. This shows FIG. 1 A fossil-fueled power station with a carbon dioxide separation device

DETAILED DESCRIPTION OF INVENTION

FIG. 1 shows the essentials of a fossil-fueled power station 1 with a heat exchanger 21 connected to a carbon dioxide separation device 5. The fossil-fueled power station 1 is here in the form of a combined cycle gas turbine (CCGT) power plant. The combined cycle gas turbine plant is shown in simplified form, and consists essentially of a gas turbine 13, a steam turbine 2, a generator 20 and a steam generator 4, connected in the exhaust gas duct of the gas turbine, in the form of a heat recovery steam generator 15. The steam turbine 2 consists of a high pressure stage 24 and a medium- and low-pressure stage 25. The gas turbine 13, the generator 20 and the steam turbine 2 are located on a common shaft 8. Connected downstream from the steam turbine 2 is a condenser 22.

The high pressure stage 24 has a live steam feed connection from the steam generator 4 via a live steam line 23 and a steam return feed connection via a cold reheater line 16. Connected to the cold reheater line 16 is a process steam line 6 for tapping off process steam 17. The medium- and low-pressure stage 25 is connected to the steam generator 4 via a hot reheater line 31. The steam extracted from the cold reheater line here has a temperature of about 160° C.

In addition to the steam turbine 2, a back-pressure steam turbine 7 is provided, this having a process steam feed connection from the process steam line 6. Expansion of the process steam 17 takes place in the back-pressure steam turbine 7, to form saturated steam 26. In the course of this, the process steam 17 is converted to electrical power by a generator 9 connected to the back-pressure steam turbine 7.

Connected to the back-pressure steam turbine 7 is a heat exchanger 21 in a carbon dioxide separation device 5. Here, the carbon dioxide separation 5 device is not shown in more detail. The back-pressure steam turbine 7 is connected to the desorption unit of the carbon dioxide separation device 5 via a saturated steam line 28. In the desorption unit, the saturated steam 26 promotes the boiling off of a solvent to release carbon dioxide.

From the heat exchanger 21, a condensate is fed out into the condenser 22 via a condensate return line 29. For this purpose, the condensate return line 29 has an appropriate connection to the condenser 22. Finally, a condensate line 30 is provided, connecting the condenser 22 to the steam generator 4, to close the feedwater circuit.

The invention claimed is:

1. A method for operating a combined cycle fossil-fueled power station of the type including a steam generator and a first steam turbine having a single housing containing both a medium pressure stage and a low pressure stage and a separate housing containing a high pressure stage, comprising:
    coupling a steam generator to a gas turbine;
    allocating low pressure steam for carbon dioxide separation from a source other than directly from the medium or low pressure stages of the first steam turbine by:
       connecting the downstream side of the high pressure stage of the first steam turbine to carry at least a portion of steam output from the high pressure stage via a cold reheater line back to the steam generator without first passing through either the medium-pressure stage or the low-pressure stage of the first steam turbine
       connecting a live steam line to carry steam from the steam generator to the high pressure stage of the first steam turbine;
       connecting a condenser downstream from the first steam turbine;
       connecting a process steam line to carry process steam from the cold reheater line to a back pressure steam turbine separate and distinct from the first steam turbine;
       expanding the process steam in the back pressure steam turbine such that saturated steam is formed;
       connecting a saturated steam line to carry saturated steam output from the back-pressure steam turbine to a heat exchanger of a carbon dioxide separation device, wherein the back pressure steam turbine is connected in the process steam line downstream from the cold reheater line and in the saturated steam line upstream from the heat exchanger of the carbon dioxide separation device, and wherein the heat exchanger of the carbon dioxide separation device is connected directly to and between the condenser and the back pressure steam turbine.

2. The method as claimed in claim 1, further comprising coupling an electric power generator to the back pressure steam turbine.

3. The method as claimed in claim 1, wherein the saturated steam is used for the desorption of carbon dioxide.

4. A fossil-fueled power station of the type having a steam turbine which includes high, medium, and low pressure stages, configured to allocate low pressure steam for carbon dioxide separation from a source other than directly from the medium or low pressure stages of the steam turbine, comprising:
    a gas turbine;
    a first steam turbine having a high pressure stage and a single housing containing both a medium-pressure stage and a low-pressure stage, with the high pressure stage in a housing separate from the single housing containing the medium-pressure stage and the low-pressure stage;
    a back-pressure steam turbine separate and distinct from the first steam turbine;
    a steam generator coupled to the gas turbine;
    a live steam line connected to carry steam from the steam generator to the high pressure stage of the first steam turbine;
    a cold reheater line connected to carry at least a portion of steam output from the high pressure stage of the first steam turbine back to the steam generator without first passing through either the medium-pressure stage or the low-pressure stage;
    a condenser connected downstream from the first steam turbine; and
    a carbon dioxide separation device comprising a heat exchanger, connected directly to and between the condenser and the back-pressure steam turbine;
    a process steam line connected to carry steam from the cold reheater line to the back-pressure steam turbine as an input to the back-pressure steam turbine;
    a saturated steam line for carrying steam output from the back-pressure steam turbine to the heat exchanger of the carbon dioxide separation device, wherein the back-pressure steam turbine is connected in the process steam line downstream from the cold reheater line and in the saturated steam line upstream from the carbon dioxide separation device.

5. The fossil-fueled power station as claimed in claim 4, wherein the back-pressure steam turbine is joined by a shaft to a generator for the purpose of generating electricity.

6. The fossil-fueled power station as claimed in claim 4, wherein the power station is in the form of a combined cycle gas turbine power plant, and the steam generator is a heat recovery steam generator.

* * * * *